US009538323B2

(12) United States Patent
Tsai et al.

(10) Patent No.: US 9,538,323 B2
(45) Date of Patent: Jan. 3, 2017

(54) WEARABLE APPARATUS AND CONTROLLING METHOD THEREOF

(71) Applicant: HTC Corporation, Taoyuan (TW)

(72) Inventors: Ming-Han Tsai, Taoyuan (TW); Chia-Wei Chen, Taoyuan (TW); Hsin-Ti Chueh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 52 days.

(21) Appl. No.: 14/631,873

(22) Filed: Feb. 26, 2015

(65) Prior Publication Data
US 2016/0255462 A1 Sep. 1, 2016

(51) Int. Cl.
H04W 24/00 (2009.01)
H04W 4/02 (2009.01)
H04M 1/725 (2006.01)
H04W 52/02 (2009.01)
G06F 1/16 (2006.01)
H04W 4/00 (2009.01)

(52) U.S. Cl.
CPC ............... H04W 4/02 (2013.01); G06F 1/163 (2013.01); H04M 1/7253 (2013.01); H04W 4/008 (2013.01); H04W 52/028 (2013.01); H04M 2250/02 (2013.01); H04M 2250/04 (2013.01); H04M 2250/06 (2013.01); H04M 2250/10 (2013.01)

(58) Field of Classification Search
CPC .......... H04W 4/02; H04W 4/008; G06F 1/163
USPC .............................................. 455/456.1, 41.2
See application file for complete search history.

(56) References Cited

U.S. PATENT DOCUMENTS

| 8,568,313 B2* | 10/2013 | Sadhu | A61B 5/0006 340/539.12 |
| 8,585,476 B2* | 11/2013 | Mullen | A63F 13/211 463/1 |
| 9,007,216 B2* | 4/2015 | Oskin | A61N 1/04 340/500 |
| 9,153,088 B2* | 10/2015 | Spencer, II | G06Q 20/327 |
| 9,237,411 B2* | 1/2016 | Holman | H04W 4/008 |
| 9,318,907 B2* | 4/2016 | Huang | H02J 7/0045 |
| 2014/0106677 A1 | 4/2014 | Altman | |

(Continued)

OTHER PUBLICATIONS

Corresponding extended European Search Report Nov. 5, 2015.

Primary Examiner — Marceau Milord
(74) Attorney, Agent, or Firm — CKC & Partners Co., Ltd.

(57) ABSTRACT

A wearable apparatus, which includes a positioning module, a local wireless communication module and a processor module, is disclosed. The processor module is adapted to send a request command through the local wireless communication module to the electronic apparatus for inquiring second positioning information generated by the electronic apparatus. In response to the processor module receives a valid request response comprising the second positioning information from the electronic apparatus, the processor module is further adapted to locate the wearable apparatus according to the second positioning information. In response to the processor module receives an invalid request response from the electronic apparatus, the processor module is further adapted to activate the positioning module to receive the first positioning information, and locate the wearable apparatus according to the first positioning information.

20 Claims, 3 Drawing Sheets

(56) References Cited

U.S. PATENT DOCUMENTS

| | | | |
|---|---|---|---|
| 2014/0267094 A1* | 9/2014 | Hwang | G06F 3/04883 345/173 |
| 2015/0031293 A1 | 1/2015 | Holman et al. | |
| 2016/0063474 A1* | 3/2016 | Spencer, II | G06Q 20/322 705/39 |
| 2016/0099602 A1* | 4/2016 | Leabman | H02J 7/025 307/104 |
| 2016/0142868 A1* | 5/2016 | Kulkarni | H04W 4/008 455/456.5 |
| 2016/0165663 A1* | 6/2016 | Shanmugam | H04W 84/12 370/338 |

* cited by examiner

WEARABLE APPARATUS AND CONTROLLING METHOD THEREOF

BACKGROUND

1. Field of Invention

The present application relates to a wearable apparatus and a controlling method. More particularly, the present application relates to how to obtain positioning information on the wearable apparatus and the controlling method thereof.

2. Description of Related Art

Recently, wearable devices (smart watches, smart wristbands, smart glasses, etc) are popular due to their mobility and various functions. Wearable devices are utilized for measuring heart rates, tracking running routes, recording motion histories of users, displaying notifications to users, and/or different functions. In order to make the wearable devices more user-friendly, the wearable devices must be compact, light-weighted and easy to carry. In addition, the wearable devices are also required to have good battery durability.

However, due to the size and weight of the wearable device are limited to maintain the mobility, it is hard to implement a battery with high capacity into the wearable device. Therefore, how to achieve more functions on the wearable device with a limited capacity of battery is an important problem.

SUMMARY

An aspect of the present disclosure is to provide a wearable apparatus, which includes a positioning module, a local wireless communication module and a processor module. The positioning module is configured for selectively receiving first positioning information. The local wireless communication module is capable of communicatively connected with an electronic apparatus. The processor module is coupled to the positioning module and the local wireless communication module. The processor module is adapted to send a request command through the local wireless communication module to the electronic apparatus for inquiring second positioning information generated by the electronic apparatus. In response to the processor module receives a valid request response including the second positioning information from the electronic apparatus, the processor module is further adapted to locate the wearable apparatus according to the second positioning information. In response to the processor module receives an invalid request response from the electronic apparatus, the processor module is further adapted to activate the positioning module to receive the first positioning information, and locate the wearable apparatus according to the first positioning information.

Another aspect of the present disclosure is to provide a controlling method, which is suitable for a wearable apparatus. The wearable apparatus includes a local wireless communication module and a positioning module for selectively receiving first positioning information. The controlling method includes steps of: sending a request command through the local wireless communication module to an electronic apparatus for inquiring second positioning information generated by the electronic apparatus; in response to a valid request response including the second positioning information is received from the electronic apparatus, locating the wearable apparatus according to the second positioning information; and, in response to an invalid request response is received from the electronic apparatus, activating the positioning module to receive the first positioning information, and locating the wearable apparatus according to the first positioning information.

Another aspect of the present disclosure is to provide a non-transitory computer-readable medium comprising one or more sequences of instructions to be executed by a processor module of a wearable apparatus for performing aforesaid controlling method.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
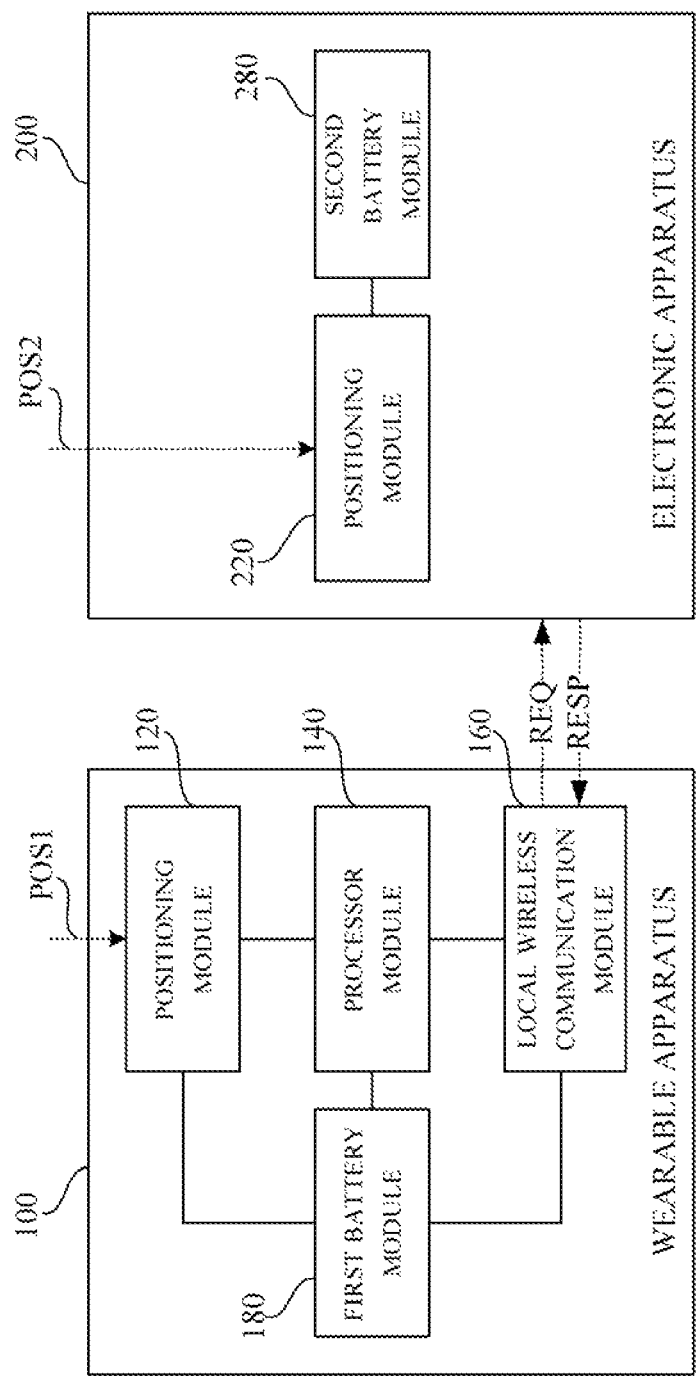
FIG. 1 is a schematic diagram illustrating a wearable apparatus according to an embodiment of the disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Reference is made to FIG. 1, which is a schematic diagram illustrating a wearable apparatus 100 according to an embodiment of the disclosure. As shown in FIG. 1, the wearable apparatus 100 includes a positioning module 120, a processor module 140, a local wireless communication module 160 and a first battery module 180. The processor module 140 is coupled with the positioning module 120 and the local wireless communication module 160. The first battery module 180 is coupled with the positioning module 120, the processor module 140 and the local wireless communication module 160 for providing electricity to aforesaid modules.

The positioning module 120 is configured for selectively receiving first positioning information POS1 from a positioning source (not shown in FIG. 1), such as a positioning satellite (e.g., GPS satellite), a cellular station, a wireless access point, etc. In some embodiment, the positioning module 120 includes at least one of a Global Positioning System (GPS) receiver unit, a GLONASS receiver unit, a Galileo receiver unit, a BeiDou Navigation Satellite System (BDS) receiver unit, and an Assisted Global Positioning System (AGPS) receiver unit, such that when the positioning module 120 is activated, the positioning module 120 will be able to receive the first positioning information POS1 indicating where the wearable apparatus 100 locates. The positioning module 120 may provide the first positioning information POS1 to the processor module 140.

Because the size and weight of the wearable device 100 are limited to maintain the mobility, it is hard to implement a battery with high capacity into the wearable device. Therefore, a first battery capacity of the first battery module 180 is usually limited. In some embodiments, the first battery capacity is ranged from 100 milliampere-hour (mAh) to 150 mAh, but this disclosure is not limited thereto.

Every time when the positioning module 120 is activated to collect the first positioning information POS1 from a positioning source, the positioning module 120 will cause a certain power consumption (ranged from 20 mAh to 30 mAh in some embodiments). In this embodiment, the wearable device 100 is able to obtain the positioning information from another device (i.e., the electronic 200 shown in FIG. 1) through a local communicative connection for optimizing the battery durability of the wearable device 100.

The local wireless communication module 160 of the wearable device 100 is capable of communicatively connected with the electronic apparatus 200, which may include a communication module (not shown in FIG. 1) corresponding to the local wireless communication module 160.

In an embodiment, the local wireless communication module 160 includes a Bluetooth Low Energy (BLE) transceiver. The Bluetooth Low Energy transceiver is able to transmit and receive data with relative low power consumption (e.g., ranged from 1 mAh to 2 mAh in some embodiments). However, the disclosure is not limited thereto. In some other embodiments, the local wireless communication module 160 includes at least one of the Bluetooth Low Energy (BLE) transceiver, a Bluetooth transceiver, a Zigbee transceiver, a Near Field Communication (NFC) transceiver, an infrared (IR) transceiver, a WiFi transceiver and any equivalent local wireless transceiver.

In this embodiment, the electronic apparatus 200 includes another positioning module 220 and a second battery module 280. The positioning module 220 is capable of receiving second positioning information POS2 indicating where the electronic apparatus 200 locates. Due to the wearable device 100 and the electronic apparatus 200 are connected by the local wireless communication module 160, the wearable device 100 and the electronic apparatus 200 are located close to each other. Therefore, the second positioning information POS2 is regarded as an equivalent location of the wearable device 100.

In practical applications, the electronic apparatus 200 can be a smartphone, a tablet computer or a Personal. Digital Assistant (PDA). A second battery capacity of the second battery module 280 is relatively higher than the first battery capacity of the wearable device 100. In some embodiments, the second battery capacity (e.g., ranged from 1500 mAh to 4000 mAh) is substantially 10 times to 30 times as much as the first battery capacity (e.g., ranged from 100 mAh to 150 mAh).

Figure 2:
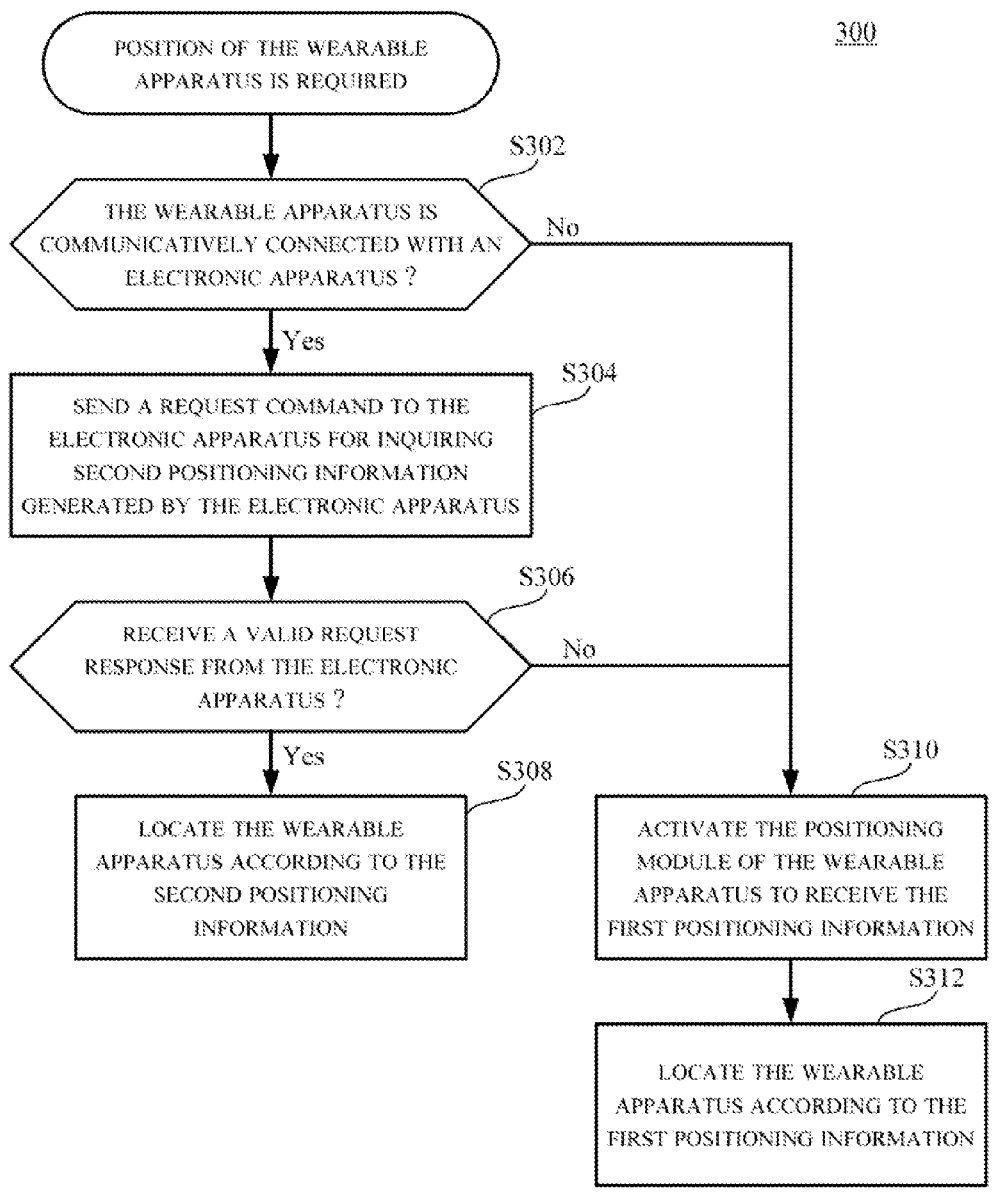
FIG. 2 is a flow diagram illustrating a controlling method according to an embodiment of the disclosure.

In some embodiments, the processor module 160 is adapted to perform a controlling method to obtain the positioning information (the first or the second positioning information) with optimized battery efficiency. Reference is made to FIG. 2, which is a flow diagram illustrating a controlling method 300 according to an embodiment of the disclosure.

As shown in FIG. 2, when position of the wearable apparatus 100 is required, e.g., a tracking function or a navigating function is launched on the wearable apparatus 100, step S302 is executed for determining whether the wearable apparatus 100 is communicatively connected (through the local wireless communication module 160) with the electronic apparatus 200.

If the wearable apparatus 100 is not communicatively connected with the electronic apparatus 200 (e.g., out of range, communication failed, etc), step S310 is executed for activating the positioning module 120 of the wearable apparatus 100 to receive the first positioning information POS1, and step S312 is executed for locating the wearable apparatus 100 according to the first positioning information POS1.

In response to the wearable apparatus 100 is communicatively connected with the electronic apparatus 200, step S304 is executed, such that the processor module 140 is adapted to send a request command REQ through the local wireless communication module 160 to the electronic apparatus 200 for inquiring the second positioning information POS2 generated by the electronic apparatus 200 (with the positioning module 220).

In response to the request command REQ, the electronic apparatus 200 will send a request response RESP back to the wearable apparatus 100.

Step S306 is executed for determining whether the wearable apparatus 100 receives a valid request response RESP from the electronic apparatus 200. In this embodiment, the valid request response RESP may include the second positioning information POS2 generated by the positioning module 220 of the electronic apparatus 200.

In response to the processor module 140 receives the valid request response RESP including the second positioning information POS2 from the electronic apparatus 200, step S308 is executed for locating the wearable apparatus 100 according to the second positioning information POS2. In practical applications, a first power consumption of sending the request command REQ, receiving the valid request response RESP or receiving the invalid request response RESP is lower than a second power consumption of activating the positioning module 120 to receive the first positioning information POS1. In practices, the first power consumption can be substantially one-tenth as much as a second power consumption. In this case, the wearable apparatus 100 is located according to the second positioning information POS2 generated by the electronic apparatus 200, and the positioning module 120 of the wearable apparatus 100 is not activated at all (from step S302 to step S308) Therefore, the overall power consumption of the wearable apparatus 100 in this positioning process can be reduced.

In response to the processor module receives an invalid request response RESP (for example, the request response RESP without the second positioning information) from the electronic apparatus, step S310 is executed for activating the positioning module 120 to receive the first positioning information POS1, and step S312 is executed for locating the wearable apparatus 100 according to the first positioning information POS1, such that the wearable apparatus 100 is still able to complete the positioning process. In this embodiment, the invalid request response RESP is received without the second positioning information POS2 for different reasons, such as the positioning module 220 of the electronic apparatus 200 is disabled (e.g., switched off by users), the positioning module 220 is not available (e.g., busy, occupied or low power) or failed to generate the second positioning information POS2 (e.g., system failure or driver error), the electronic apparatus 200 rejects the request command REQ (e.g., according to user's instructions or low power limitation), or even the electronic apparatus 200 is not equipped with any positioning module in some other embodiments. Once the request response RESP is invalid, the positioning module 120 is activated to receive the first positioning information POS1.

Figure 3:
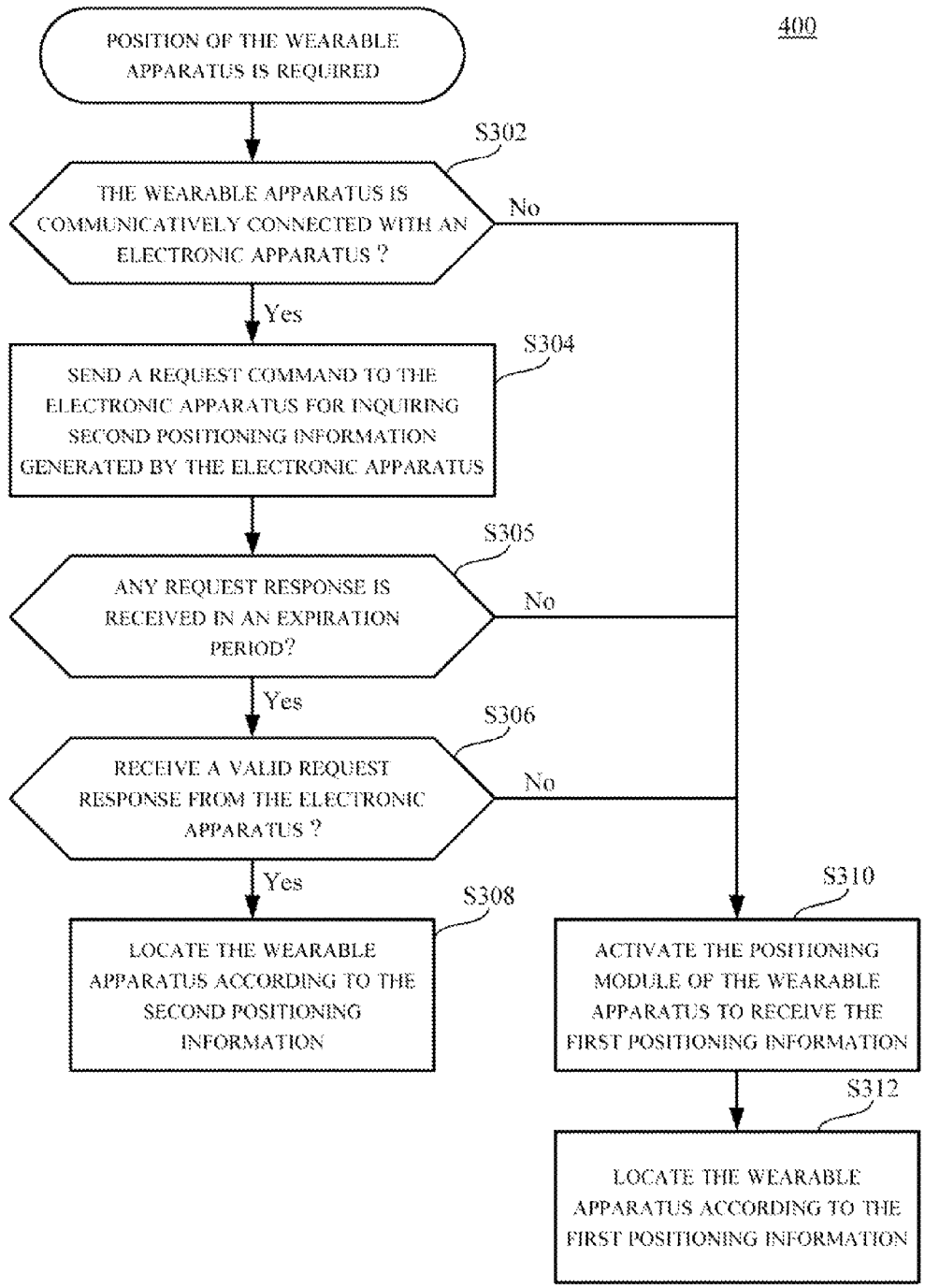
FIG. 3 is a flow diagram illustrating a controlling method according to another embodiment of the disclosure.

Reference is also made to FIG. 3, which is a flow diagram illustrating a controlling method 400 according to another embodiment of the disclosure. Steps S302~S304 and step S306~S312 of the controlling method 400 is similar to the controlling method 300 in aforesaid embodiment and not to be repeated here. As shown in FIG. 3, the controlling method 400 further include step S305 after the request command REQ is sent to the electronic apparatus 200. Step S305 is executed for determining if any request response RESP is received in an expiration period (e.g., five seconds, one minute, etc). Steps S310 and S312 will be executed if there is no request response received in the expiration period since the request command REQ is sent, such that the wearable apparatus 100 can instantaneously obtain the positioning information without spending a long time waiting the request response RESP, which may be lost during the transmission.

Another embodiment of the present disclosure is a non-transitory computer-readable medium (not shown in FIG. 1) including one or more sequences of instructions to be executed by the processor module 140 of the wearable apparatus 100 for performing aforesaid controlling method 300/400.

Based on aforesaid embodiments, the wearable apparatus 100, the controlling method 300/400 and the non-transitory computer-readable medium are able to reduce the overall power consumption during the positioning process on the wearable apparatus 100. The wearable apparatus 100 can share the resource of the electronic apparatus 200 if available. Otherwise, the wearable apparatus 100 can obtain the positioning information by the built-in positioning module. It is suitable to solve the problem of the limited battery capacity on the wearable apparatus 100.

In this document, the term "coupled" may also be termed as "electrically coupled", and the term "connected" may be termed as "electrically connected". "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A wearable apparatus, comprising:
   a positioning module, configured for selectively receiving first positioning information;
   a local wireless communication module, capable of communicatively connected with an external electronic apparatus; and
   a processor module, coupled to the positioning module and the local wireless communication module, the processor module being adapted to:
   send a request command through the local wireless communication module to the external electronic apparatus for inquiring second positioning information generated by the external electronic apparatus;
   in response to a valid request response corresponding to the request command is received from the external electronic apparatus and the valid request response comprises the second positioning information, locate the wearable apparatus according to the second positioning information; and
   in response to an invalid request response corresponding to the request command is received from the external electronic apparatus, activate the positioning module to receive the first positioning information, and locate the wearable apparatus according to the first positioning information.

2. The wearable apparatus of claim 1, further comprising:
   a first battery module, coupled to the positioning module, the local wireless communication module and the processor module, wherein the first battery module has a first battery capacity, the first battery capacity is lower than a second battery capacity of the external electronic apparatus.

3. The wearable apparatus of claim 2, wherein the external electronic apparatus is a smartphone, a tablet computer or a Personal Digital Assistant (PDA), the second battery capacity is substantially 10 times to 30 times as much as the first battery capacity.

4. The wearable apparatus of claim 1, wherein the positioning module comprises at least one of a Global Positioning System (GPS) receiver unit, a GLONASS receiver unit, a Galileo receiver unit, a BeiDou Navigation Satellite System (BDS) receiver unit, and an Assisted Global Positioning System (AGPS) receiver unit.

5. The wearable apparatus of claim 1, wherein the local wireless communication module comprises at least one of a Bluetooth Low Energy (BLE) transceiver, a Bluetooth transceiver, a Zigbee transceiver, a Near Field Communication (NFC) transceiver, an infrared (IR) transceiver and a WiFi transceiver.

6. The wearable apparatus of claim 5, wherein a first power consumption of sending the request command, receiving the valid request response or receiving the invalid request response is lower than a second power consumption of activating the positioning module to receive the first positioning information.

7. The wearable apparatus of claim 1, wherein the processor module receives the invalid request response when a positioning module of the external electronic apparatus is disabled, not available or failed to generate the second positioning information, when the external electronic apparatus rejects the request command, or when the external electronic apparatus is not equipped with any positioning module.

8. The wearable apparatus of claim 1, wherein the processor module further activates the positioning module to receive the first positioning information in response to no request response is received in an expiration period since the request command is sent.

9. A controlling method, suitable for a wearable apparatus, the wearable apparatus comprising a local wireless communication module and a positioning module for selectively receiving first positioning information, the controlling method comprising:
   sending a request command through the local wireless communication module to an external electronic apparatus for inquiring second positioning information generated by the external electronic apparatus;

in response to a valid request response corresponding to the request command is received from the external electronic apparatus and the valid request response comprises the second positioning information, locating the wearable apparatus according to the second positioning information; and in response to an invalid request response corresponding to the request command is received from the external electronic apparatus, activating the positioning module to receive the first positioning information, and locating the wearable apparatus according to the first positioning information.

10. The controlling method of claim 9, further comprising:

in response to no request response is received in an expiration period since the request command is sent, activating the positioning module to receive the first positioning information, and locating the wearable apparatus according to the first positioning information.

11. The controlling method of claim 9, wherein the positioning module comprises at least one of a Global Positioning System (GPS) receiver unit, a GLONASS receiver unit, a Galileo receiver unit, a BeiDou Navigation Satellite System (BDS) receiver unit, and an Assisted Global Positioning System (AGPS) receiver unit.

12. The controlling method of claim 9, wherein the local wireless communication module comprises at least one of a Bluetooth Low Energy (BLE) transceiver, a Bluetooth transceiver, a Zigbee transceiver, a Near Field Communication (NFC) transceiver, an infrared (IR) transceiver and a WiFi transceiver.

13. The controlling method of claim 12, wherein a first power consumption of sending the request command, receiving the valid request response or receiving the invalid request response is lower than a second power consumption of activating the positioning module to receive the first positioning information.

14. The controlling method of claim 9, wherein the invalid request response is received when a positioning module of the external electronic apparatus is disabled, not available or failed to generate the second positioning information, when the external electronic apparatus rejects the request command, or when the external electronic apparatus is not equipped with any positioning module.

15. A non-transitory computer-readable medium comprising one or more sequences of instructions to be executed by a processor module of a wearable apparatus for performing a controlling method, the wearable apparatus comprising a local wireless communication module and a positioning module for selectively receiving first positioning information, the controlling method comprising:

sending a request command through the local wireless communication module to an external electronic apparatus for inquiring second positioning information generated by the external electronic apparatus;

in response to a valid request response corresponding to the request command is received from the external electronic apparatus and the valid request response comprises the second positioning information, locating the wearable apparatus according to the second positioning information; and in response to an invalid request response corresponding to the request command is received from the external electronic apparatus, activating the positioning module to receive the first positioning information, and locating the wearable apparatus according to the first positioning information.

16. The non-transitory computer-readable medium of claim 15, wherein the controlling method further comprises:

in response to no request response is received in an expiration period since the request command is sent, activating the positioning module to receive the first positioning information, and locating the wearable apparatus according to the first positioning information.

17. The non-transitory computer-readable medium of claim 15, wherein the positioning module comprises at least one of a Global Positioning System (GPS) receiver unit, a GLONASS receiver unit, a Galileo receiver unit, a BeiDou Navigation Satellite System (BDS) receiver unit, and an Assisted Global Positioning System (AGPS) receiver unit.

18. The non-transitory computer-readable medium of claim 15, wherein the local wireless communication module comprises at least one of a Bluetooth Low Energy (BLE) transceiver, a Bluetooth transceiver, a Zigbee transceiver, a Near Field Communication (NFC) transceiver, an infrared (IR) transceiver and a WiFi transceiver.

19. The non-transitory computer-readable medium of claim 18, wherein a first power consumption of sending the request command, receiving the valid request response or receiving the invalid request response is lower than a second power consumption of activating the positioning module to receive the first positioning information.

20. The non-transitory computer-readable medium of claim 15, wherein the invalid request response is received when a positioning module of the external electronic apparatus is disabled, not available or failed to generate the second positioning information, when the external electronic apparatus rejects the request command, or when the external electronic apparatus is not equipped with any positioning module.

* * * * *